(12) United States Patent
Brandt et al.

(10) Patent No.: US 6,224,354 B1
(45) Date of Patent: May 1, 2001

(54) LEAKAGE STORAGE MEANS FOR A SUBMERSIBLE MACHINE

(75) Inventors: Bengt-Ake Brandt, Sundbyberg; Boris Fredriksson, Huddinge, both of (SE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/243,979

(22) Filed: Feb. 4, 1999

(30) Foreign Application Priority Data

Mar. 4, 1998 (SE) .................................... 980676-0

(51) Int. Cl.$^7$ ....................................... F04B 17/00
(52) U.S. Cl. .................. 417/423.11; 417/423.3; 417/423.13; 277/428; 277/429
(58) Field of Search .................. 417/423.11, 423.13, 417/423.3; 277/358, 408, 428, 429, 918

(56) References Cited

U.S. PATENT DOCUMENTS 1,855,274 * 4/1932 Arutunoff .......................... 417/423.3
4,621,981 * 11/1986 Lorett .............................. 417/423.11
5,336,048 * 8/1994 Ganzon et al. ....................... 415/175

FOREIGN PATENT DOCUMENTS

698696 * 11/1964 (CA) ................................. 417/423.3
358008870A * 1/1983 (JP) ..................................... 277/428

* cited by examiner

Primary Examiner—Timothy S. Thorpe
Assistant Examiner—Cheryl J. Tyler
(74) Attorney, Agent, or Firm—Menotti J. Lombardi

(57) ABSTRACT

The invention concerns a device for a submersible machine, such as a pump, a turbine or a mixer. The machine includes a driving unit (1) and a hydraulic unit (2) having an impeller connected to the driving unit via a rotary shaft (3). In order to prevent the medium in the hydraulic unit from entering the driving unit along the driving shaft, an intermediate seal device is arranged. The seal device includes two mechanical face seals (5) and (6) and an intermediate room (7) containing barrier liquid. In order to prevent possible leaking barrier liquid from damaging the shaft bearing (4), a storage tank (9) for collecting said liquid is arranged within the room (7).

3 Claims, 1 Drawing Sheet

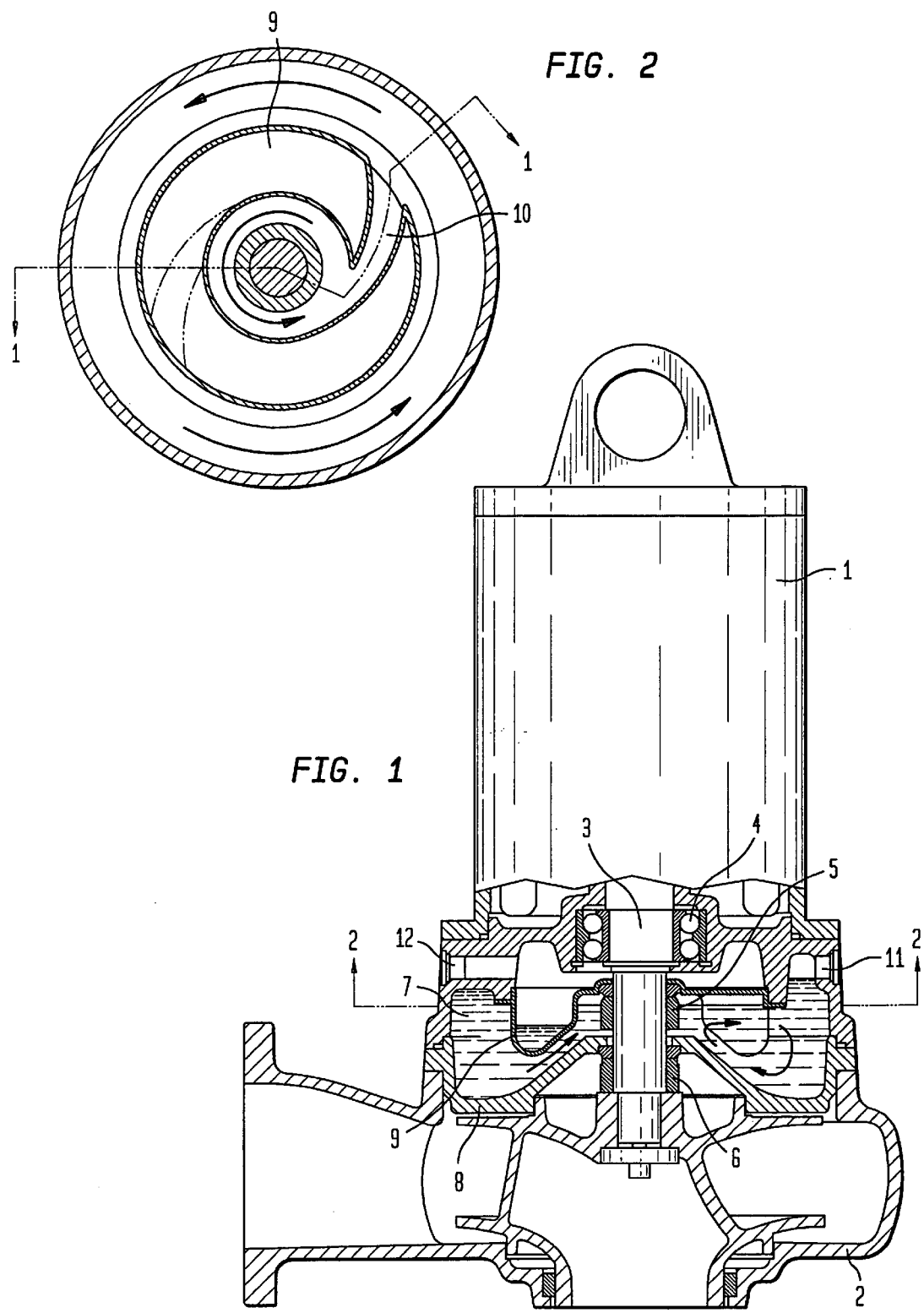

LEAKAGE STORAGE MEANS FOR A SUBMERSIBLE MACHINE

FIELD OF THE INVENTION

The present invention concerns a device for a submersible machine, such as a pump, a turbine or a mixer.

BACKGROUND OF THE INVENTION

A machine of this type normally includes an electrically driven motor and a hydraulic unit with an impeller connected to the motor via a rotary driving shaft. In order to prevent the medium within the hydraulic unit from flowing along the shaft and penetrate the electric motor and cause damage, one or several seals are arranged between the motor and the hydraulic unit. A common type of seal is the so-called mechanical face seal, which comprises one seal ring rotating with the shaft and one stationary seal ring mounted in the surrounding housing. The two rings are pressed together by spring force thus preventing medium from penetrating between them.

If the medium within the hydraulic unit contains pollutants, a special problem occurs. As the pressure within the hydraulic unit is higher, pollutants may penetrate between the seal surfaces and cause damage, meaning that the seal result is worsened or fails totally.

In order to solve this problem it is common to arrange two mechanical seals parted by a room filled with a barrier liquid such as oil, which lubricates and cools the surfaces. By this the seal adjacent the electric motor will always operate with a clean medium and thus the risks for damages will decrease drastically. If the seal adjacent the hydraulic unit should be damaged, medium from said unit may enter the barrier liquid room, but by controlling said liquid at regular intervals, the seal could be repaired or replaced before any serious damage has accured. An example on such a design is shown in the Swedish patent No 381 318.

The rotary driving shaft is supported by two bearings, here called the upper and the lower bearing respectively, the latter adjacent the hydraulic unit and located close to the previously mentioned mechanical seal. The bearing, normally a ball bearing, must be lubricated in such a way that metallic contacts between the balls, the treads and the holders are prevented. In addition these surfaces must be prevented from being corroded. If barrier liquid should enter through the seal adjacent the lower bearing, there is a risk that the leakage may brake the lubricating film and generate a bearing brake down.

In order to diminish the above mentioned risk, it has been suggested to arrange a tank for collecting such leakage and store it in such a way that it is prevented from penetrating the bearing and cause damage to the lubricating medium. The storage tank must be big enough to be able to contain all leakage and also be designed in such a way, that the latter is kept parted from the bearing, independent of the operation position of the machine. A machine such as a pump may take lying (horizontal) as well as upright (vertical) operating positions.

In a known design a ring formed chamber is arranged around the barrier liquid housing for collecting leakage. The advantage is that the chamber easily can be dimensioned big enough and that the leakage is kept away from the bearing. A disadvantage is however, that it is large, expensive and requires extended feeding pipes for the barrier liquid.

The purpose of the invention is thus to obtain a storing tank for leakage which tank should require a limited space and be able to store leakage away from the bearing. In addition it should be so designed that it does not constitute an obstacle for the flow within the seal housing, but should add to that flow. This is obtained by help of the device stated in the claims.

SUMMARY OF THE INVENTION

A device for a submersible machine including a pump, a turbine or a mixer and comprising an electrically driven motor unit and a hydraulic unit having an impeller connected to the motor via a rotary driving shaft, and a sealing unit arranged between said driving unit and said hydraulic unit, said sealing unit comprising an upper and a lower mechanical face seal and an intermediate room for barrier liquid, wherein the barrier liquid room is provided with an inner tank that opens towards the motor for collecting and storing leakage from the room that may pass the upper seal.

BRIEF DESCRIPTION OF THE DRAWINGS

The invention is disclosed below with reference to the enclosed drawings.

FIG. 1 shows a a cut, partly in section, through a pump with a device according to the invention, while FIG. 2 shows a cut along 1—1 in FIG. 1.

DETAILED DESCRIPTION OF THE INVENTION

In the drawings 1 stands for a driving unit in a submerible pump, 2 a hydraulic unit and 3 a rotary driving shaft. 4 stands for a shaft bearing, 5 and 6 mechanical seals, 7 a barrier liquid room having a bottom 8, 9 stands for a storage tank for leakage, 10 grooves in the tank and 11 and 12 inlet and outlet ports for liquid.

As previously mentioned a pump impeller in the hydraulic unit 2 is driven by a motor unit 1, normally an electric motor, via a rotary shaft 3. In order to prevent the medium within the hydraulic unit from entering the motor, two intermediate mechanical face seals 5 and 6 are arranged . The seals are lubricated and cooled by a barrier medium in the room 7, the medium in turn being cooled through contact with the bottom 8 of said room, the other side of which being cooled by the pumped medium in the hydraulic unit. A good circulation of the barrier medium is thus a condition for the seals being able to operate satisfactory. If this medium should pass the upper seal 5, there is a risk that it eventually enters the lower bearing and damages its lubrication means. According to the invention, a tank 9 is arranged which collects possible leakage. The size and design of the tank is such, that the leakage is stored away from the bearing in order not to cause the damage mentioned above. This means that the tank 9 must be extended relatively far below into the room 7 in order to obtain a sufficient volume and to keep the leakage sufficiently far away from the bearing 4, even when the pump takes a position with horizonal driving shaft.

The barrier liquid is added through the port 11. During filling, the pump takes an upright position with the vertical driving shaft, which means that the liquid level will not go higher than the lower part of said port. By this it is assured that a sufficiently big air volume is kept to allow the liquid to expand at higher temperatures.

The storing tank 9 brings however certain problems. When adding barrier liquid into the room 7, the tank could prevent the liquid from reaching the level of the upper seal 5, before the level of the port 11 is reached as an air pocket is created. In addition the tank could create an obstacle for the flow of liquid which shall lubricate and cool the seal surfaces. According to a preferred embodiment of the invention, the bottom of the tank 9 is provided with one or several mainly radially directed, downwardly open and upwardly closed grooves 10. These grooves create one or several separate sections for leakage within the tank 9. In this way a circulation of the barrier liquid through the grooves ensures that the lubrication and the cooling will be sufficient. In addition the grooves mean that enough barrier liquid can always be added before the level of the port 11 is reached.

In the drawing 12 stands for an outlet port for leakage liquid. If more than one groove 10 is arranged at the bottom of the tank 9, each of the created sections must be provided with a port.

According to an additional development of the invention the grooves 10 are designed with outwardly increasing cross sections for further improvement of the flow.

What is claimed is:

1. A device for a submersible machine comprising an electrically driven motor unit and a hydraulic unit having an impeller connected to the motor via a rotary driving shaft, and a sealing unit arranged between said driving unit and said hydraulic unit, said sealing unit comprising an upper and a lower mechanical face seal and an intermediate room for barrier liquid, wherein the barrier liquid room is provided with an inner tank having a top that opens towards the motor and away from the liquid room, for collecting and storing leakage from the room that may pass the upper seal.

2. A device according to claim 1, wherein the inner tank includes a bottom which is provided with at least one mainly radially directed groove which creates sections within the tank and obtains good circulation possibilities in the room, the at least one groove opening toward the bottom of the tank.

3. A device according to claim 2, wherein the at least one groove is designed with an outwardly increasing cross section.

\* \* \* \* \*